United States Patent
Kitano

(10) Patent No.: US 9,130,489 B2
(45) Date of Patent: Sep. 8, 2015

(54) VEHICLE AND CONTROL METHOD OF VEHICLE

(75) Inventor: Eiji Kitano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 65 days.

(21) Appl. No.: 14/130,395

(22) PCT Filed: Jul. 12, 2011

(86) PCT No.: PCT/JP2011/065866
§ 371 (c)(1),
(2), (4) Date: Dec. 31, 2013

(87) PCT Pub. No.: WO2013/008313
PCT Pub. Date: Jan. 17, 2013

(65) Prior Publication Data
US 2014/0132190 A1 May 15, 2014

(51) Int. Cl.
*H02P 6/12* (2006.01)
*B60L 3/00* (2006.01)
(Continued)

(52) U.S. Cl.
CPC . *H02P 6/12* (2013.01); *B60L 3/003* (2013.01); *B60L 3/0069* (2013.01); *B60L 3/04* (2013.01); *B60L 7/14* (2013.01); *B60L 11/005* (2013.01); *B60L 11/1803* (2013.01); *B60L 15/007* (2013.01); *B60L 15/2009* (2013.01); *B60L 2210/10* (2013.01); *B60L 2240/12* (2013.01); *B60L 2240/423* (2013.01); *B60L 2240/525* (2013.01); *Y02T 10/642* (2013.01); *Y02T 10/7005* (2013.01); *Y02T 10/7022* (2013.01); *Y02T 10/7216* (2013.01); *Y02T 10/7275* (2013.01)

(58) Field of Classification Search
CPC .......................................................... H02P 6/12
USPC .................................................... 318/400.22
See application file for complete search history.

(56) References Cited

U.S. PATENT DOCUMENTS 7,969,104 B2 * 6/2011 Taniguchi ..................... 318/139
2007/0249461 A1 10/2007 Tsuji et al.

FOREIGN PATENT DOCUMENTS

| JP | 11 332002 | 11/1999 |
| JP | 2004 120883 | 4/2004 |

(Continued)

OTHER PUBLICATIONS

International Search Report Issued Oct. 18, 2011 in PCT/JP11/065866 Filed Jul. 12, 2011.

*Primary Examiner* — David S Luo
(74) *Attorney, Agent, or Firm* — Oblon, McClelland, Maier & Neustadt, L.L.P.

(57) ABSTRACT

A vehicle converts DC power from a power storage device into AC power by an inverter to run by driving a three-phase motor generator. A switching unit is provided at a path electrically connecting the motor generator and the inverter. The switching unit includes a relay corresponding to each phase. Each relay is configured to connect a coil of a corresponding phase in the motor generator to a corresponding driving arm in the inverter, or to a connection node of capacitors connected in series between direct current side terminals of the inverter. When short-circuit failure is detected at a switching element of any one of the phases in the inverter, an ECU switches the relay of the corresponding phase in the switching unit to the side of the connection node.

10 Claims, 5 Drawing Sheets

(51) Int. Cl.
*B60L 3/04* (2006.01)
*B60L 7/14* (2006.01)
*B60L 11/00* (2006.01)
*B60L 11/18* (2006.01)
*B60L 15/00* (2006.01)
*B60L 15/20* (2006.01)

(56) References Cited

FOREIGN PATENT DOCUMENTS

| | | |
|---|---|---|
| JP | 2007 312588 | 11/2007 |
| JP | 2007 336727 | 12/2007 |
| JP | 2008 125162 | 5/2008 |

* cited by examiner

VEHICLE AND CONTROL METHOD OF VEHICLE

TECHNICAL FIELD

The present invention relates to a vehicle, and a control method of a vehicle, more particularly, control in an event of inverter failure at a vehicle capable of running by driving an AC electric motor through an inverter.

BACKGROUND ART

As an environment-friendly vehicle in recent years, attention is focused on a vehicle that has a power storage device (for example, a secondary battery, capacitor or the like) mounted and that runs using the driving force generated from electric power stored in the power storage device. Such a vehicle includes, for example, an electric vehicle, a hybrid vehicle, a fuel cell vehicle, and the like.

In such a vehicle, the DC power from the power storage device is converted, generally using an inverter, into AC power for driving a rotating electric machine such as a motor generator. The vehicle is made to run using the driving force generated by the rotating electric machine, and the rotative force from a driving wheel, engine, or the like is converted into electric energy to charge the power storage device during regenerative braking.

When an error occurs in the inverter at such a vehicle, appropriate measures must be taken to prevent other devices from being affected.

Japanese Patent Laying-Open No. 11-332002 (PTD 1) discloses a configuration in which an electric vehicle driving a motor by an inverter has inverter error detected based on whether the accumulated value of deviation Δld and Δlq between current command values ld* and lq* to the inverter and actual current values ld and lq exceeds a predetermined level, and when inverter error is detected, the inverter is shut down to stop the system.

CITATION LIST

Patent Document

PTD 1: Japanese Patent Laying-Open No. 11-332002
PTD 2: Japanese Patent Laying-Open No. 2004-120883

SUMMARY OF INVENTION

Technical Problem

In the configuration disclosed in Japanese Patent Laying-Open No. 11-332002 (PTD 1), an effect towards another device can be suppressed, when inverter error occurs, by shutting down the inverter. However, this means that the system will be stopped in the event of inverter error during vehicle running so that limp home running of the vehicle is disallowed, leading to the possibility of being stranded on the road.

In the case where a permanent magnet type motor having a permanent magnet embedded in the rotor is employed as the motor, towing by another vehicle or the like in the event of short-circuit failure of a switching element in an inverter may cause short-circuit current to be generated at the circuit constituting the inverter and motor due to the motor induced voltage generated by motor rotation through a driving wheel. Accordingly, the motor and/or cable will generate heat by the short-circuit current to become the cause of device failure.

In view of the foregoing, an object of the present invention is to allow, at a vehicle capable of running by driving an AC electric motor through an inverter, limp home running while achieving appropriate device protection in an event of inverter failure.

Solution to Problem

A vehicle according to the present invention is capable of running by traction driving force using electric power from a power storage device, and includes a three-phase AC rotating electric machine for generating traction driving force, an inverter, first and second capacitors, a switching unit, and a control device. The inverter converts DC power from the power storage device into AC power to drive the rotating electric machine. The first and second capacitors are connected in series between direct current side terminals of the inverter. The switching unit is provided at a path electrically connecting the rotating electric machine and the inverter to connect coils of three phases in the rotating electric machine either to respective driving arms of three phases in the inverter, or to a connection node of the first and second capacitors. The control device controls the switching unit, in an event of failure occurring in a driving arm of one phase among the driving arms of three phases, such that a coil in the rotating electric machine corresponding to the failure-occurring driving arm is connected to the side of the connection node.

Preferably, when failure occurs in the inverter during vehicle running, the control device controls the switching unit such that the coil in the rotating electric machine corresponding to the failure-occurring driving arm is connected to the side of the connection node, and then drives the rotating electric machine using the driving arms of the remaining two phases.

Preferably, when inverter failure occurs during vehicle running, the control device controls the switching unit such that the coils of three phases in the rotating electric machine are kept connected to the side of the driving arms in a state where speed of the vehicle exceeds a predetermined reference speed, and such that the coil in the rotating electric machine corresponding to the failure-occurring driving arm is connected to the side of the connection node in a state where the speed of the vehicle becomes lower than the reference speed.

Preferably, when the absolute value of voltage difference between voltage across the first capacitor and voltage across the second capacitor exceeds a predetermined threshold value, the control device controls the inverter such that output power of the rotating electric machine is restricted as compared to the case where the absolute value of voltage difference is lower than the threshold value.

Preferably, the control device determines the failure-occurring driving arm in the inverter, based on a failure signal output from the inverter.

Preferably, the control device determines the failure-occurring driving arm in the inverter, based on the level of current flowing from the inverter to the rotating electric machine exceeding a predetermined value.

Preferably, in an event of failure occurring in the inverter when the rotating electric machine attains a rotating state during stoppage of the inverter, the control device controls the switching unit such that the coil in the rotating electric machine corresponding to the failure-occurring driving arm is connected to the side of the connection node.

Preferably, the control device determines the failure-occurring driving arm in the inverter, based on a failure signal output from the inverter.

Preferably, the control device determines the failure-occurring driving arm in the inverter, based on a level of current flowing from the inverter to the rotating electric machine exceeding a predetermined value.

Preferably, the control device determines the failure-occurring driving arm in the inverter, based on a signal set by the user.

Preferably, the rotating electric machine includes a rotor in which a permanent magnet is embedded.

A control method of a vehicle according to the present invention is directed to a vehicle capable of running by traction driving force using electric power from a power storage device. The vehicle includes a three-phase AC rotating electric machine for generating traction driving force, an inverter for converting DC power from the power storage device into AC power to drive the rotating electric machine, first and second capacitors connected in series, between direct current side terminals of the inverter, and a switching unit provided at a path electrically connecting the rotating electric machine and the inverter, and configured to connect coils of three phases in the rotating electric machine to either respective driving arms of three phases in the inverter, or to a connection node of the first and second capacitors. The control method includes the steps of: detecting that failure has occurred in one of the driving arms of three phases in the inverter, and controlling the switching unit such that a coil in the rotating electric machine corresponding to the failure-occurring driving arm is connected to the side of the connection node.

Advantageous Effects of Invention

According to the present invention, limp home running is allowed while achieving appropriate device protection in an event of inverter failure, at a vehicle capable of running by driving an AC electric motor through the inverter.

DESCRIPTION OF EMBODIMENTS

Figure 1:
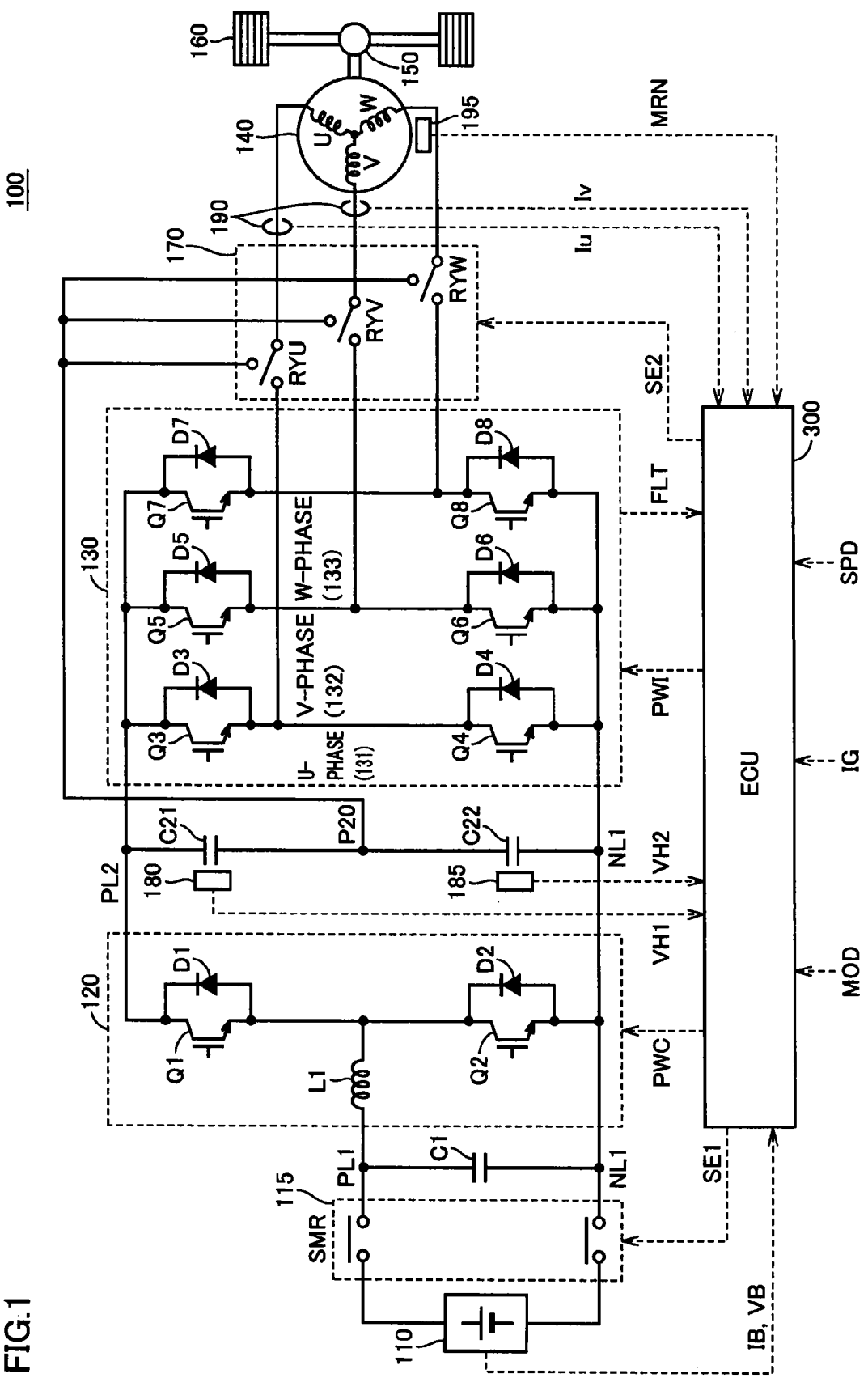
FIG. 1 is an entire block diagram of a vehicle 100 according to an embodiment.

Embodiments of the present invention will be described in detail hereinafter with reference to the drawings. In the drawings, the same or corresponding elements have the same reference characters allotted, and description thereof will not be repeated.

[Vehicle Basic Configuration]

FIG. 1 is an entire block diagram of a vehicle 100 according to an embodiment of the present invention. Although the present embodiment will be described based on an electric vehicle as an example of vehicle 100, the configuration of vehicle 100 is not limited thereto, and is applicable to any vehicle that can run by electric power from a power storage device. For example, vehicle 100 includes a hybrid vehicle, a fuel cell vehicle, or the like, other than an electric vehicle.

Referring to FIG. 1, vehicle 100 includes a power storage device 110, a system main relay (SMR) 115, a converter 120, an inverter 130, a motor generator 140, a power transmission gear 150, a driving wheel 160, a switching unit 170, and an ECU (Electronic Control Unit) 300.

Power storage device 110 is a power storage component configured to allow charging/discharging. Power storage device 110 is, for example, a secondary battery such as a lithium ion battery, nickel-metal hydride battery, or lead battery, or a power storage element such an electric double layer capacitor.

Power storage device 110 is connected to a converter 120 of converter 120 via power lines PL1 and NL1. Power storage device 110 supplies the electric power to drive motor generator 140 towards converter 120. Furthermore, power storage device 110 stores electric power generated at motor generator 140. Power storage device 110 has an output of approximately 200V, for example.

The relays in SMR 115 are connected to power storage device 110 and power lines PL1 and NL1. SMR 115 is controlled by a control signal SE1 from ECU 300 to switch between supply and cut off of electric power between power storage device 110 and converter 120.

Capacitor C1 is connected between a power line PL1 and a power line NL1. Capacitor C1 reduces the voltage variation between power line PL1 and power line NL1.

Converter 120 includes switching elements Q1 and Q2, diodes D1 and D2, and a reactor L1.

Switching elements Q1 and Q2 are connected in series between power lines PL2 and NL1, with the direction from power line PL2 towards power line NL1 as the forward direction. Although an IGBT is taken as an example of a switching element in the present embodiment, a power MOS (Metal Oxide Semiconductor) transistor, a power bipolar transistor or the like may be employed instead of an IGBT.

Antiparallel diodes D1 and D2 are connected to switching elements Q1 and Q2, respectively. Reactor L1 is provided between the connection node of switching elements Q1 and Q2 and power line PL1. In other words, converter 120 constitutes a chopper circuit.

Switching elements Q1 and Q2 are controlled by a control signal PWC from ECU 300 to perform a voltage conversion operation between power lines PL1 and NL1 and power lines PL2 and NL1.

Basically, converter 120 is controlled such that switching elements Q1 and Q2 are turned ON and OFF alternately and in a complementary manner within each switching period. Converter 120 boosts the DC voltage from power storage device 110 in a boosting operation. This boosting operation is conducted by supplying the electromagnetic energy stored in reactor L1 during the ON period of switching element Q2 onto power line PL2 via switching element Q1 and antiparallel diode D1.

Converter 120 steps down the DC voltage from inverter 130 in a step-down operation. This step-down operation is conducted by supplying the electromagnetic energy stored in reactor L1 during the ON period of switching element Q1 to power line NL1 via switching element Q2 and antiparallel diode D2.

The voltage conversion ratio in such boosting operation and step-down operation is controlled by the ON period ratio (duty ratio) of switching elements Q1 and Q2 in the aforementioned switching period. In the case where a boosting operation and step-down operation are not required, the voltage conversion ratio can be set at 1.0 (duty ratio=100%) by setting control signal PWC such that switching elements Q1 and Q2 are fixed at an ON and OFF state, respectively.

In the present invention, converter 120 is dispensable, and a configuration in which the output voltage from power storage device 110 is directly supplied to inverter 130 may be employed.

Capacitors C21 and C22 are connected in series between power lines PL2 and NL1 connecting converter 120 and inverter 130. Capacitors C21 and C22 together reduce the voltage variation between power line PL2 and power line NL1. Voltage sensors 180 and 185 detect the voltage across capacitors C21 and C22, respectively, to provide detection values VH1 and VH2 to ECU 300. Although the capacitance of capacitors C21 and C22 is arbitrary, preferably the same level is set therefor.

Inverter 130 is connected to converter 120 via power lines PL2 and NL1. Inverter 130 is controlled by a control command PWI from ECU 300 to convert the DC power output from converter 120 into AC power for driving motor generator 140.

Inverter 130 includes a U-phase arm 131, a V-phase arm 132, and a W-phase arm 133, constituting a three-phase bridge circuit. U-phase arm 131, V-phase arm 132 and W-phase arm 133 are connected in parallel between power line PL2 and power line NL1.

U-phase arm 131 includes switching elements Q3 and Q4 connected in series between power line PL2 and power line NL1, and diodes D3 and D4 connected parallel to switching elements Q3 and Q4, respectively. Diode D3 has its cathode and its anode connected to the collector and emitter, respectively, of switching element Q3. Diode D4 has its cathode and its anode connected to the collector and emitter, respectively, of switching element Q4.

V-phase arm 132 includes switching elements Q5 and Q6 connected in series between power line PL2 and power line NL1, and diodes D5 and D6 connected parallel to switching elements Q5 and Q6, respectively. Diode D5 has its cathode and its anode connected to the collector and emitter, respectively, of switching element Q5. Diode D6 has its cathode and its anode connected to the collector and emitter, respectively, of switching element Q6.

W-phase arm 133 includes switching elements Q7 and Q8 connected in series between power line PL2 and power line NL1, and diodes D7 and D8 connected parallel to switching elements Q7 and Q8, respectively. Diode D7 has its cathode and its anode connected to the collector and emitter, respectively, of switching element Q7. Diode D8 has its cathode and its anode connected to the collector and emitter, respectively, of switching element Q8.

Motor generator 140 is a three-phase AC motor generator including a rotor in which a permanent magnet is embedded and a stator having a three-phase coil arranged in a Y-configuration at the neutral point. The three coils of the U, V, and W phase each have one end connected in common to the neutral point. The U-phase coil has the other end connected to the connection node of switching elements Q3 and Q4. The V-phase coil has the other end connected to the connection node of switching elements Q5 and Q6. The W-phase coil has the other end connected to the connection node of switching elements Q7 and Q8.

The output torque of motor generator 140 is transmitted to driving wheel 160 via a power transmission gear 150 configured including a speed reducer and a power split mechanism to cause vehicle 100 to run. Motor generator 140 can generate power by the rotative force of driving wheel 160 during a regenerative braking operation of vehicle 100. The generated electric power is converted into the charging electric power for power storage device 110 by inverter 130.

In a hybrid vehicle having an engine (not shown) mounted in addition to motor generator 140, this engine and motor generator 140 are operated cooperatively to generate the required vehicle driving force. In this case, power storage device 110 can be charged using the electric power generated by the rotation of the engine.

Although a configuration in which one motor generator is provided is shown in FIG. 1, the number of motor generators is not limited thereto. A configuration in which a plurality of motor generators are provided may be employed. For example, in the case of a hybrid vehicle including two motor generators, one motor generator may be used exclusively as an electric motor to drive driving wheel 160 whereas the other motor generator is used exclusively as a power generator driven by the engine.

Switching unit 170 is inserted in a power transmission path connecting inverter 130 and motor generator 140. Switching unit 170 includes relays RYU, RYV and RYW corresponding to the U, V, and W phase, respectively. Relays RYU, RYV and RYW are configured to be controlled independently by a control signal SE2 from ECU 300.

Relay RYU connects the U-phase coil of motor generator 140 to either the connection node of switching elements Q3 and Q4 of U-phase arm 131 or to connection node P20 of capacitors C21 and C22. Relay RYV connects the V-phase coil of motor generator 140 to either the connection node of switching elements Q5 and Q6 of V-phase arm 132 or to connection node P20 of capacitors C21 and C22. Relay RYW connects the W-phase coil of motor generator 140 to either the connection node of switching elements Q7 and Q8 of W-phase arm 133 or to connection node P20 of capacitors C21 and C22.

Relays RYU, RYV and RYW of switching unit 170 are connected to the connection node of switching elements in a driving arm of a phase corresponding to the coil of each phase in motor generator 140, when no failure occurs in inverter 130. When short-circuit failure occurs in a switching element in inverter 130, the relay of the phase where short-circuit failure has occurred, among relays RYU, RYV and RYW in switching unit 170, has the corresponding coil of the relevant phase connected to connection node P20 of capacitors C21 and C22.

A current sensor 190 is provided at a power transmission path between switching unit 170 and motor generator 140. Since the sum of the current flowing through each phase of motor generator 140 always becomes zero, current sensor 190 is to be provided at any of at least two phases in the power transmission path. In FIG. 1, current sensor 190 is provided at the power transmission path of the U phase and V phase, for example. The detected currents Iu and Iv are provided to ECU 300.

A rotation speed sensor 195 is provided at motor generator 140. Rotation speed sensor 195 detects the rotation speed of motor generator 140, and provides detection value MRN thereof to ECU 300. Rotation speed sensor 195 may be a degree of rotation sensor for detecting the degree of rotation of motor generator 140. In this case, the rotation speed of motor generator 140 is calculated at ECU 300 from the detected degree of rotation.

ECU 300 includes a CPU (Central Processing Unit), a storage device and an input/output buffer, all not shown in FIG. 1, to input a signal from each sensor, output a control signal to each device, and to control vehicle 100 as well as each device. Control at ECU 300 is not restricted to processing by software, and processing by dedicated hardware (electronic circuit) is allowed.

Although a configuration in which one ECU 300 is provided as a control device will be described in FIG. 1, the configuration of the control device is not limited thereto. For example, a configuration in which a control device is provided for each device or for each function may be employed for ECU 300.

ECU 300 receives voltage VB and current IB from power storage device 110. ECU 300 calculates the state of charge (SOC) of the power storage device based on voltage VB and current IB.

ECU 300 receives from inverter 130 a failure signal FLT indicting failure in inverter 130. Failure signal FLT includes information such as which of the U phase, V phase and W phase, and which of switching elements Q3-Q8 an error has occurred.

ECU 300 receives information SPD indicating the vehicle speed (hereinafter, also simply referred to as "vehicle speed SPD") from a vehicle speed sensor not shown. ECU 300 also receives an ignition signal IG according to an operation by the user. Moreover, ECU 300 receives a mode signal MOD indicating that a towing operation is to be performed when a mode signal is set by a user operation in the case where vehicle 100 is to be towed by another vehicle.

[Limp Home Control]

Figure 2:
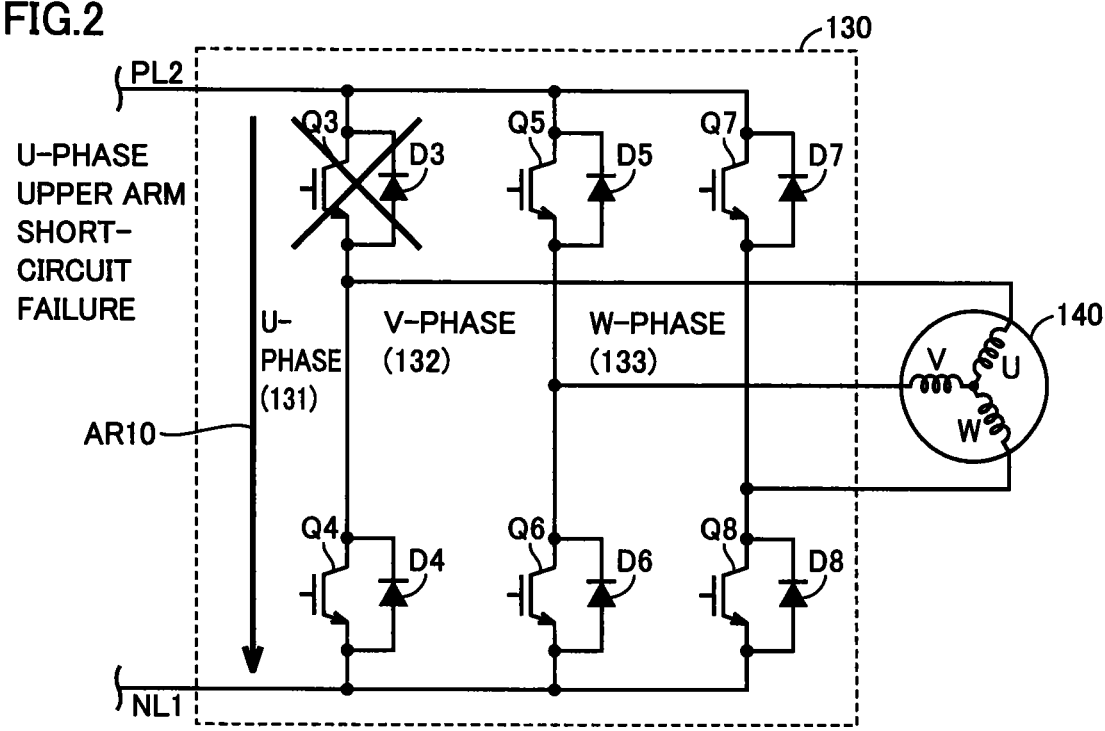
FIG. 2 is a diagram to describe short-circuit current when short-circuit failure occurs in a switching element in an inverter during running.

In the case of short-circuit failure in which switching element Q3, for example in U-phase arm 131 in inverter 130 is kept at a conducting state during a running operation of such a vehicle 100, continuation of the switching operation while running will cause short-circuit between power lines PL2 and NL1 when switching element Q4 that is the lower arm of the U phase attains a conducting state, so that a high short-circuit current flows in the direction of arrow AR10 in FIG. 2. Such a continuous flow of the short-circuit current may also damage switching element Q4 that was formerly not damaged, or heat may being generated at the power path of power lines PL2, NL1, and the like.

It is therefore desirable to stop inverter 130 promptly when such error occurs in inverter 130.

However, if inverter 130 is stopped, motor generator 140 cannot be driven. Therefore, in the case where an error occurs in inverter 130 during running at an electric vehicle or the like that does not have an engine, the vehicle will not be able to run on its own if the inertia running ends and the vehicle stops. In such a case, the vehicle will be stranded on the road to cause traffic holdup, and/or cannot arrive at the repair site.

In view of the foregoing, the present embodiment is based on a configuration in which, when short-circuit failure occurs in the switching element in any one phase in inverter 130, the switching element where an error has occurred is disconnected from motor generator 140 by switching unit 170 to allow motor generator 140 to be driven using the remaining two sound phases to perform limp home running.

The method of driving an AC electric motor using two phases from the three phases of the AC electric motor is disclosed in Japanese Patent Laying-Open No. 2004-120883 (PTD 2), for example, and details thereof will not be repeated here. In outline, the four switching elements of the driving arm where failure has not occurred receive a PWM (Power Width Modulation) signal generated using two different sine wave signals having a predetermined frequency differing in phase by 60° from each other. Accordingly, by causing line voltage having a phase difference of $\pi/3$ to be developed at the three-phase excitation winding, the AC electric motor is driven using sound switching elements of two phases.

Figure 3:
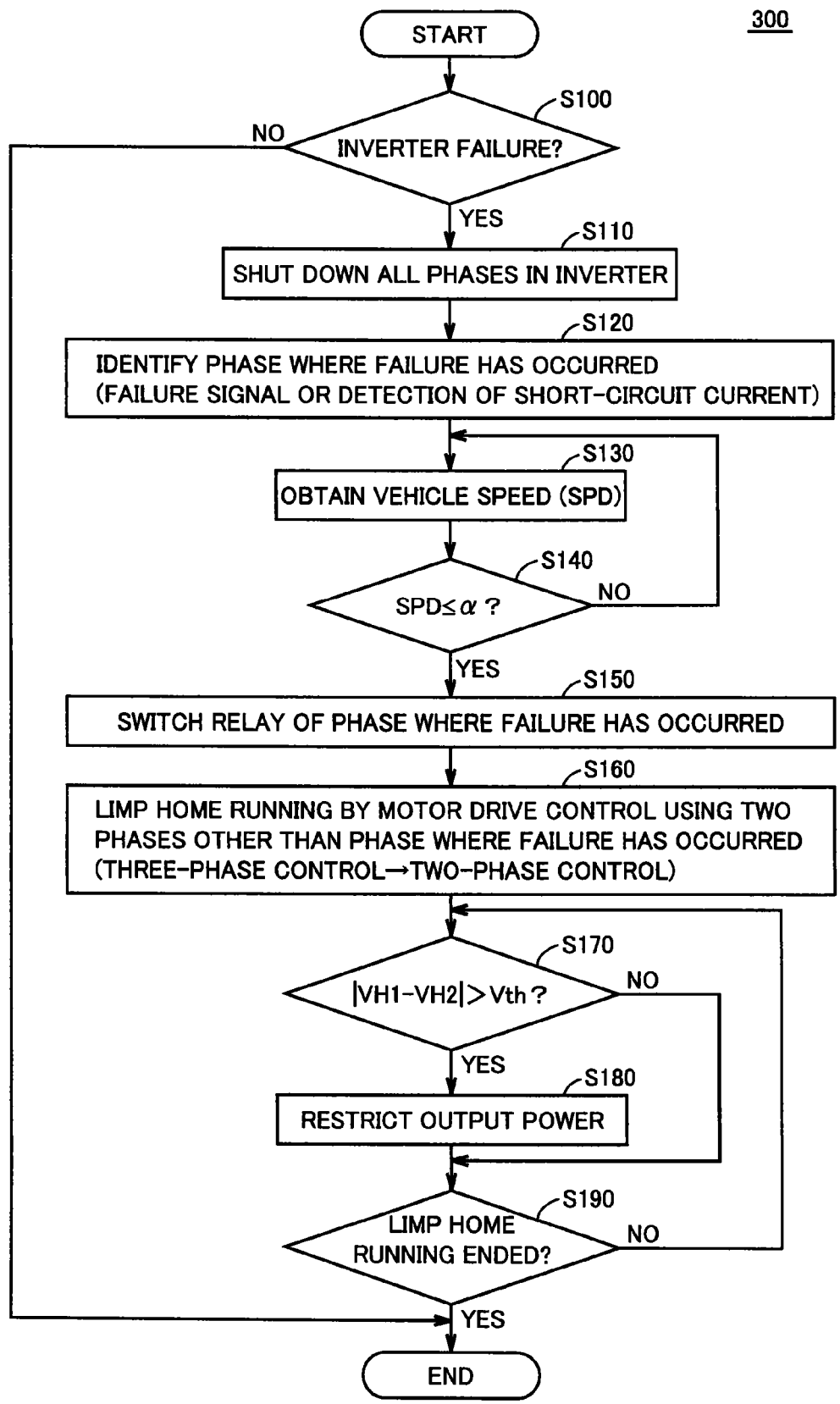
FIG. 3 is a flowchart to describe limp home running control in an event of inverter failure.

FIG. 3 is a flowchart to describe a limp home control process executed at ECU 300 in the present embodiment. Each step in the flowchart of FIG. 3 and FIG. 5 that will be described afterwards is implemented by invoking a program prestored in ECU 300 from the main routine at a predetermined cycle for execution. Alternatively, some of the steps may be implemented by developing dedicated hardware (electronic circuit).

Referring to FIGS. 1 and 3, ECU 300 determines whether short-circuit failure has occurred in a switching element in any one of the phases in inverter 130 at step (hereinafter, step abbreviated as S) 100.

The determination of failure may be made by failure signal FLT output from inverter 130 or by detecting the short-circuit current that flows in the event of failure occurrence by a detection value from current sensor 190.

When failure has not occurred in inverter 130 (NO at S100), ECU 300 skips the subsequent steps to end the process since limp home running is not required.

When failure has occurred in inverter 130 (YES at S100), control proceeds to S110 where ECU 300 shuts down inverter 130 with the switching elements of all phases rendered nonconductive to avoid failure at another device due to short-circuit current. Accordingly, the traction driving force by motor generator 140 is lost during a running operation of vehicle 100, leading to inertia running.

Then, ECU 300 identifies the phase corresponding to the switching element where short-circuit failure had occurred from the aforementioned failure signal FLT or detection of short-circuit current.

At S130, ECU 300 obtains vehicle speed SPD from a vehicle speed sensor not shown to determine whether the obtained vehicle speed SPD is less than or equal to a predetermined reference speed a. Alternative to vehicle speed SPD by a vehicle speed sensor, rotation speed MRN of motor generator 140 may be used instead of vehicle speed SPD by a vehicle speed sensor.

For the phase where an error has occurred, the coil of the corresponding phase in motor generator 140 is connected to connection node P20 of capacitors C21 and C22 by the relay in switching unit 170. Since motor generator 140 employs a permanent magnet for the generation of magnetic field at this stage, rotation of motor generator 140 by the inertia running causes induced voltage to be generated at the coil by electromagnet induction. Since this induced voltage attains a level proportional to the rotation speed of motor generator 140, the rotation speed of motor generator 140 is increased when vehicle speed SPD is high. There is a possibility that the induced voltage generated will exceed the breakdown voltage of capacitors C21 and C22 to cause damage thereof.

Therefore, in the case where vehicle speed SPD exceeds reference speed a (NO at S140), control returns to S130 where ECU 300 continues inertia running until vehicle speed SPD becomes less than or equal to reference speed a.

When vehicle speed SPD becomes less than or equal to reference speed a (YES at S140), control proceeds to S150 where ECU 300 switches the relay of the phase corresponding to the phase where failure has occurred in switching unit 170 to connect the coil of the relevant phase in motor generator 140 to connection node P20 of capacitors C21 and C22.

At S160, ECU 300 initiates the driving of motor generator 140 using the remaining two phases, excluding the phase where failure has occurred. Accordingly, the traction driving force can be generated by motor generator 140, allowing limp home running of vehicle 100.

At S170, ECU 300 determines whether the absolute value of the voltage difference between capacitors C21 and C22 is greater than a threshold value Vth.

During execution of two-phase control of motor generator 140, motor generator 140 is driven according to the switching operation of inverter 130. By the rapid load variation and the like, the potential of connection node P20 of capacitors C21 and C22 is altered, causing unbalance between voltages VH1 and VH2 across capacitors C21 and C22.

Generally, the capacitance of capacitors C21 and C22 is often set as low as possible within the range where voltage variation that may occur in normal running can be suppressed, from the standpoint of cost. If the tolerable range of the voltage difference between capacitors C21 and C22 during limp home operation is increased, the capacitance of capacitors C21 and C22 will accordingly be increased to cause higher cost.

In view of the foregoing, the present embodiment employs the method of reducing the voltage difference between capacitors C21 and C22 by restricting the power output from motor generator 140, when the voltage difference between capacitors C21 and C22 becomes large.

When the absolute value of the voltage difference between capacitors C21 and C22 is greater than a threshold value Vth (YES at S170), control proceeds to S180 where ECU 300 restricts the output such that the power output from motor generator 140 becomes smaller. Specifically, an upper limit is set for the required torque based on an accelerator operation made by the user, and/or the required torque is reduced at a predetermined ratio. Then, control proceeds to S190.

When the absolute value of the voltage difference between capacitors C21 and C22 is less than or equal to threshold value Vth (NO at S170), control proceeds to S190, skipping S180.

At S190, ECU 300 determines whether limp home running has ended or not. The ending of limp home running is determined based on ignition signal IG set OFF through an operation of the ignition key or ignition switch by the user, or through a particular operation directed to canceling limp home running.

When limp home running has not ended (NO at S190), control returns to S170 where ECU 300 continues the limp home running control while restricting the output according to the voltage difference between capacitors C21 and C22.

When limp home running has ended (YES at S190), ECU 300 ends the process.

Although not shown in FIG. 3, when the fault at inverter 130 is repaired, the relay that was switched to the side of connection node P20 of capacitors C21 and C22 at switching unit 170 is returned to the side of inverter 130.

By performing processing according to the control set forth above, limp home running is allowed while achieving appropriate device protection in an event of inverter failure at a vehicle capable of running by driving the AC electric motor through the inverter.

[Control During Towing]

In the case where traction driving force by motor generator 140 cannot be generated such as after the aforementioned limp home running has ended or by a failure at a device other than inverter 130, a towing operation by another vehicle may be carried out.

When driving wheel 160 is rotated by the towing, the aforementioned induced voltage is generated at the coil of motor generator 140. In other words, motor generator 140 acts as a voltage source.

Figure 4:
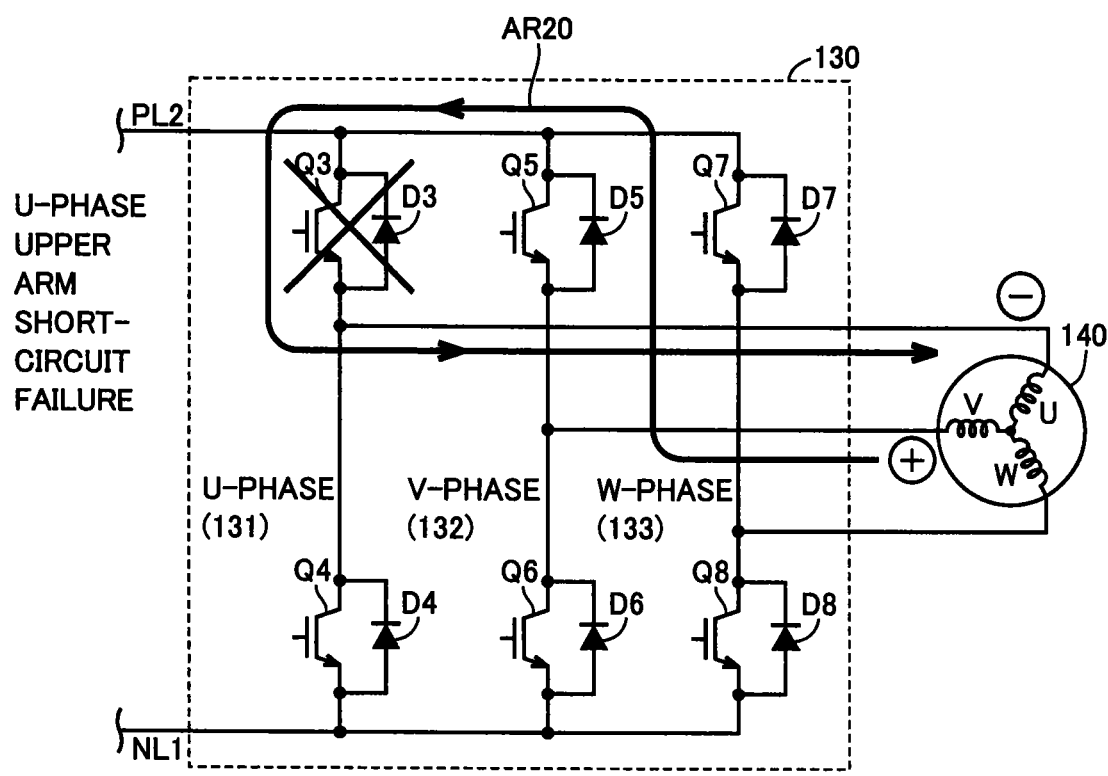
FIG. 4 is a diagram to describe short-circuit current generated during towing of a vehicle when short-circuit failure has occurred in a switching element of an inverter.

Consider the case where short-circuit occurs in switching element Q3 that is the upper arm of the U phase in inverter 130, as shown in FIG. 4, for example. If induced voltage causing the connection terminal of the V-phase coil to attain positive and the connection terminal of the U phase coil to attain negative is generated at motor generator 140 at this stage, short-circuit current may flow from the V-phase connection terminal at motor generator 140 to the U-phase connection terminal via diode D5 and switching element Q3 where short-circuit failure has occurred, as indicated by arrow AR20 in FIG. 4.

Accordingly, the electric cable of the path through which the short-circuit current flows and motor generator 140 generate heat. This will cause reduction in the insulation of the sheath of the electric cable and/or reduction in the magnetic attraction of the permanent magnet in motor generator 140, leading to the possibility of the function and feature of the device being degraded.

Thus, in the case where short-circuit failure occurs in an inverter at a vehicle that can run by driving a motor generator through the inverter, particular transportation means is required when the disabled vehicle is to be moved, such as mounting the disabled vehicle on the bed of another vehicle such as a truck for transportation or install a wagon under the driving wheel to prevent the driving wheel from rotating, followed by towing.

In the event of short-circuit failure at the inverter in the present embodiment, device protection control is executed when the vehicle is to be towed, allowing towing by even another general vehicle.

Figure 5:
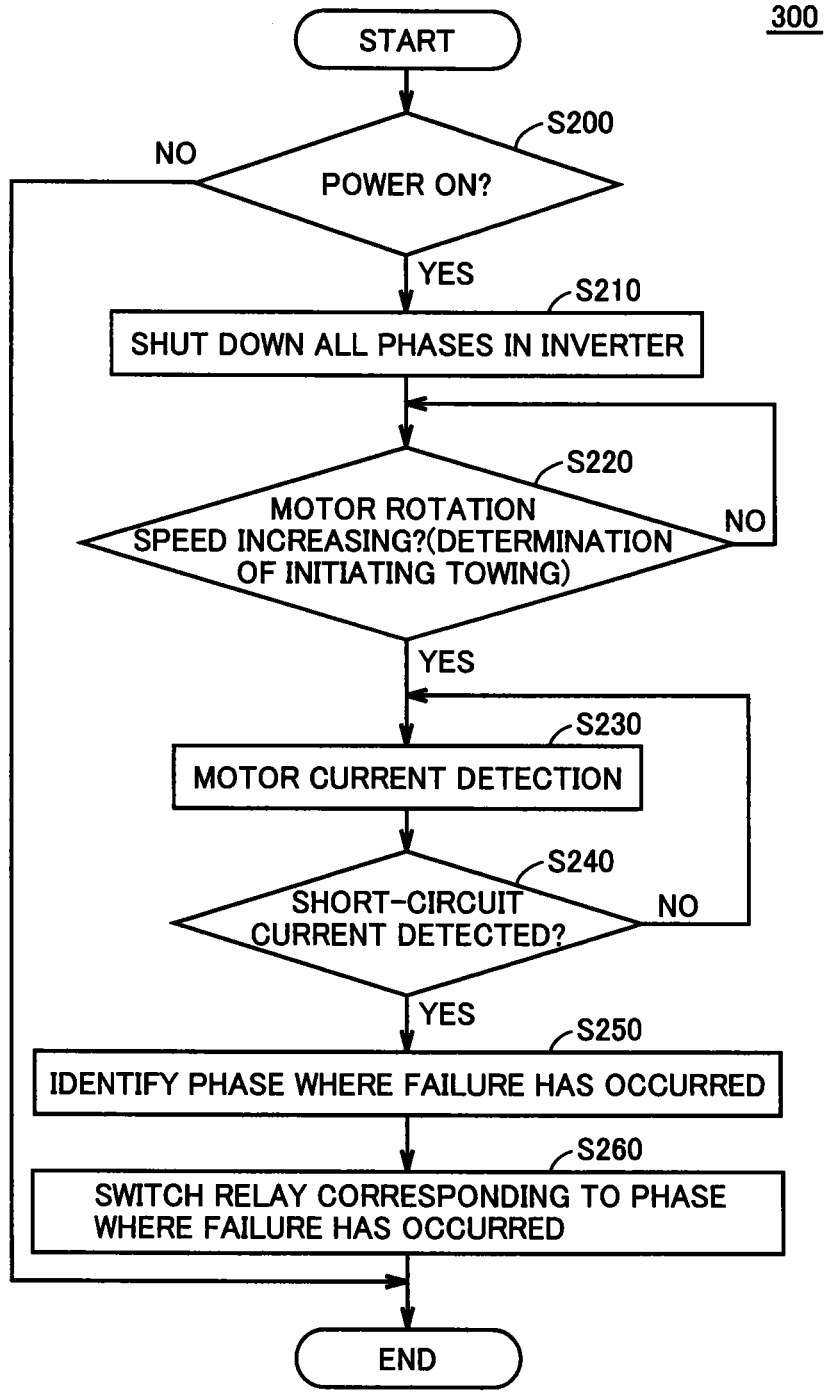
FIG. 5 is a flowchart to describe protection control when towing is executed in an event of failure occurring in the inverter.

FIG. 5 is a flowchart to describe protection control when towing is to be carried out in the event of short-circuit failure occurring at inverter 130.

Referring to FIGS. 1 and 5, ECU 300 determines whether the power is set ON at S200. This is because towing generally cannot be carried out when the power is not ON, since the shift position of the gear (not shown) cannot be released from the parking position (P).

When ignition signal IG is OFF (NO at S200), ECU 300 ends the process since the park position cannot be canceled.

When ignition signal IG is ON (YES at S200), control proceeds to S210 where ECU 300 renders switching elements Q3-Q8 of all the phases in inverter 130 non-conductive for shut down.

Then, control proceeds to S220 where ECU 300 determines whether rotation speed MRN of motor generator is increasing or not. This is directed to determining whether towing has been initiated or not. In the case where motor generator 140 is rotating although the driving of motor generator 140 by inverter 130 is stopped, a determination is made that the vehicle is made to move by another external force, i.e. towing is performed. ECU 300 may also determine that towing has been initiated in the case of receiving a mode signal MOD indicating a towing mode set by the user.

When a determination is made that towing is not initiated (NO at S220), control returns to S220 where ECU 300 waits for the initiation of towing.

When a determination is made that towing is initiated (YES at S220), ECU 300 determines whether short-circuit failure has occurred in inverter 130. Specifically, ECU 300 detects the current flowing to motor generator 140 at S230, and determines whether short-circuit current has been detected at S240.

When short-circuit current is not detected (NO at S240), control returns to S230 where ECU 300 continues to monitor the current flowing to motor generator 140 during towing, since short-circuit failure has not occurred in inverter 130.

When short-circuit current is detected (YES at S240), control proceeds to S250 where ECU 300 identifies the phase where short-circuit failure has occurred from the detected short-circuit current.

At S260, ECU 300 switches the relay corresponding to the phase where short-circuit failure has occurred in switching unit 170. Thus, short-circuit current can be prevented from flowing continuously.

FIG. 5 corresponds to the case where the occurrence of short-circuit failure at inverter 130 and identification of the phase where short-circuit failure has occurred are determined based on the current value detected at current sensor 190. Alternatively, the occurrence of short-circuit failure and identification of the phase where short-circuit failure has occurred may be made based on failure signal FLT from inverter 130, as described in the limp home running according to FIG. 3.

The towing initiation determination at S220 can be made other than by towing through another vehicle. For example, the condition of S220 may be met in the case where the vehicle is moved by manpower or when the vehicle is moved by gravity such as on a downhill. Since short-circuit current may similarly flow in the event of short-circuit failure at inverter 130 in the aforementioned cases, the process shown in FIG. 5 is preferably executed to correspond in a similar manner as towing by another vehicle.

By performing control according to the above-described processing, short-circuit current caused by the occurrence of short-circuit failure at the inverter can be prevented during vehicle towing. Thus, degradation of the function and feature of the device caused by short-circuit current can be prevented.

The limp home control and protection control described with reference to FIGS. 3 and 5 may be applied individually or in combination to the vehicle.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 100 vehicle; 110 power storage device; 115 SMR; 120 converter; 130 inverter; 131 U-phase arm; 132 V-phase arm; 133 W-phase arm; 140 motor generator; 150 power transmission gear; 160 driving wheel; 170 switching unit; 180, 185 voltage sensor; 190 current sensor; 195 rotation speed sensor; 300 ECU; C1, C21, C22 capacitor; D1-D8 diode; L1 reactor; NL1, PL1, PL2 power line; P20 connection node; Q1-Q8 switching element; RYU, RYV, RYW relay.

The invention claimed is:

1. A vehicle capable of running by traction driving force using electric power from a power storage device, the vehicle comprising:
    a three-phase AC rotating electric machine for generating traction driving force,
    an inverter configured to convert DC power from the power storage device into AC power to drive the rotating electric machine,
    first and second capacitors connected in series between direct current side terminals of the inverter,
    a switching unit provided at a path electrically connecting the rotating electric machine and the inverter, and configured to connect coils of three phases in the rotating electric machine either to respective driving arms of three phases in the inverter, or to a connection node of the first and second capacitors, and
    a control device configured to control the switching unit, in an event of failure occurring in a driving arm of one phase among the driving arms of three phases during running of the vehicle, such that a coil in the rotating electric machine corresponding to the failure-occurring driving arm is connected to a side of the connection node, and then drive the rotating electric machine using the driving arms of the remaining two phases,
    the control device controlling the inverter such that, when an absolute value of voltage difference between voltage across the first capacitor and voltage across the second capacitor exceeds a predetermined threshold value, output power of the rotating electric machine is restricted, as compared to a case where the absolute value of the voltage difference is lower than the threshold value.

2. The vehicle according to claim 1, wherein, when failure occurs in the inverter during running of the vehicle, the control device controls the switching unit such that the coils of three phases in the rotating electric machine are kept connected to the side of the driving arms in a state where speed of the vehicle exceeds a predetermined reference speed, and such that the coil in the rotating electric machine corresponding to the failure-occurring driving arm is connected to the side of the connection node in a state where the speed of the vehicle becomes lower than the reference speed.

3. The vehicle according to claim 1, wherein the control device determines a failure-occurring driving arm in the inverter, based on a failure signal output from the inverter.

4. The vehicle according to claim 1, wherein the control device determines a failure-occurring driving arm in the inverter, based on a level of current flowing from the inverter to the rotating electric machine exceeding a predetermined value.

5. The vehicle according to claim 1, wherein, in an event of failure occurring in the inverter when the rotating electric machine attains a rotating state during stoppage of the inverter, the control device controls the switching unit such that the coil in the rotating electric machine corresponding to the failure-occurring driving arm is connected to the side of the connection node.

6. The vehicle according to claim 5, wherein the control device determines a failure-occurring driving arm in the inverter, based on a failure signal output from the inverter.

7. The vehicle according to claim 5, wherein the control device determines a failure-occurring driving arm in the inverter, based on a level of current flowing from the inverter to the rotating electric machine exceeding a predetermined value.

8. The vehicle according to claim 5, wherein the control device determines a failure-occurring driving arm in the inverter, based on a signal set by a user.

9. The vehicle according to claim 1, wherein the rotating electric machine includes a rotor in which a permanent magnet is embedded.

10. A control method of a vehicle capable of running by traction driving force using electric power from a power storage device,
    the vehicle including
    a three-phase AC rotating electric machine for generating traction driving force,
    an inverter configured to convert DC power from the power storage device into AC power to drive the rotating electric machine,
    first and second capacitors connected in series between direct current side terminals of the inverter, a switching unit provided at a path electrically connecting the rotating electric machine and the inverter, and configured to connect coils of three phases in the rotating electric machine either to respective driving arms of three phases in the inverter, or to a connection node of the first and second capacitors, the control method comprising the steps of:

detecting that failure has occurred in one of the driving arms of three phases in the inverter, controlling the switching unit such that a coil in the rotating electric machine corresponding to the failure-occurring driving arm is connected to a side of the connection node, driving the rotating electric machine using driving arms of the remaining two phases, after execution of the step of controlling the switching unit, determining whether an absolute value of voltage difference between voltage across the first capacitor and voltage across the second capacitor exceeds a predetermined threshold value, and controlling the inverter such that, when the absolute value of voltage difference exceeds the threshold value, output power of the rotating electric machine is restricted, as compared to a case where the absolute value of the voltage difference is lower than the threshold value.

* * * * *